United States Patent

Arrington, Jr. et al.

[19]

[11] Patent Number: 6,138,021
[45] Date of Patent: *Oct. 24, 2000

[54] METHOD AND APPARATUS FOR PROVIDING DETERMINISTIC HAND-OFFS IN A CELLULAR COMMUNICATION SYSTEM

[75] Inventors: Arthur Edward Arrington, Jr., Round Hill, Va.; Shawn Wesley Hogberg, Chandler; Dennis Wayne Rebertus, Mesa, both of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/963,211

[22] Filed: Nov. 3, 1997

[51] Int. Cl.[7] ...................................................... H04Q 7/20
[52] U.S. Cl. ...................... 455/436; 455/12.1; 455/429; 455/441; 342/357.06; 342/357.13
[58] Field of Search ...................................... 455/428, 429, 455/436, 440, 441, 12.1; 342/357.01, 357.06, 357.13, 357.16

[56] References Cited

U.S. PATENT DOCUMENTS

| | | | |
|---|---|---|---|
| 5,161,248 | 11/1992 | Bertiger et al. | 455/17 |
| 5,268,694 | 12/1993 | Jan et al. | 342/354 |
| 5,367,304 | 11/1994 | Jan et al. | 342/352 |
| 5,457,810 | 10/1995 | Ivanov et al. | 455/441 |
| 5,483,664 | 1/1996 | Moritz et al. | 455/13.1 |
| 5,590,395 | 12/1996 | Diekelman | 455/13.1 |
| 5,669,061 | 9/1997 | Schipper | 455/429 |

*Primary Examiner*—Lee Nguyen
*Attorney, Agent, or Firm*—Harold C. McGurk; James E. Klekotka

[57] ABSTRACT

In cellular communication systems, hand-offs are performed to maintain links as subscriber units (110) and cells (420, 450) move relative to each other. The hand-off process is improved by using a pre-stored time-based cell map (400) and precise geo-location data. This information is used to set a hand-off timer for deterministically initiating the hand-off process in the current cell (500). The timer diminishes the amount of power monitoring which is required in the hand-off initiation process. This capability is especially important in satellite communication systems with fast moving cells and sharp boundaries.

10 Claims, 4 Drawing Sheets ic to cellular communication systems and, more particularly, to a method and apparatus for providing deterministic hand-offs in a cellular communication system.

METHOD AND APPARATUS FOR PROVIDING DETERMINISTIC HAND-OFFS IN A CELLULAR COMMUNICATION SYSTEM

FIELD OF THE INVENTION

This invention relates generally to cellular communication systems and, more particularly, to a method and apparatus for providing deterministic hand-offs in a cellular communication system.

BACKGROUND OF THE INVENTION

One problem which cellular communications systems address is the handing-off of communications between cells. Relative movement between subscriber units and cells causes the subscriber units and the communication links directed thereto to move between cells. To permit continuous communications in an ongoing call, the system must "hand-off" the communication when the subscriber unit crosses a cell boundary. If a communication is not handed off to a new cell upon leaving an old cell, the communication will eventually be lost because the strength of signals over which communications take place would diminish to a point where the satellite cannot receive the subscriber unit's transmissions, or vice versa.

A satellite cellular communication system with non-geosynchronous orbiting satellites must address the motion of the satellite's antenna beam coverage areas relative to the subscriber units. The satellite beams sweep over the earth's surface at such a high rate of speed that a given subscriber will move through a number of beams during a particular call. In many cases, a subscriber unit may also be serviced by two or more different satellites during a call.

Typically, a conventional cellular communication system deals with the satellite motion by "handing-off" subscriber units from beam to beam or satellite to satellite when the subscriber unit detects that better service is available in a new antenna beam. Whenever one of these hand-offs occurs, the subscriber unit is assigned a new communication channel in the new beam. Each of these hand-offs requires the exchange of signaling data between the satellite and the subscriber unit. If these signaling messages are not received in a timely manner, the call may be dropped when the current beam no longer provides enough signal strength to maintain the link.

The hand-off rate increases rapidly as the number of beams is increased to provide more antenna gain, better link performance or a smaller channel reuse distance. In some satellite systems, there are many antenna beams per satellite. As a result, subscriber units may hand-off from beam to beam as often as once per minute and between satellites about once in five minutes. When the number of beams is increased or more satellites are used, the beam to beam hand-off interval may be reduced to 15 seconds or less. The additional processing and bandwidth required to support this increased hand-off rate, along with the loss in call completion reliability creates an undesirable situation, especially with systems using smaller antenna beams.

Thus, what is needed are a method and apparatus that reduces the amount of processing that a subscriber unit is required to perform for handing-off communications between cells.

DETAILED DESCRIPTION OF THE DRAWINGS

The method and apparatus of the present invention eliminate the need for subscriber units to continuously monitor the power level for received signals to determine when to initiate a hand-off. The method and apparatus of the present invention reduce the amount of processing that a subscriber unit is required to perform for handing-off communications between cells. Cell maps are used by the subscriber units to determine when hand-offs should be initiated. Hand-off initiation calculations are performed once, and a timer is set. The subscriber unit does not spend any more time doing hand-off calculations until the timer expires. In this way, the processing load on the subscriber unit is decreased.

The present invention is applicable to satellite communication systems that assign particular regions on the earth to specific cells on the earth, and preferably to satellite communication systems that move cells across the surface of the earth. Also, the present invention is applicable to satellite communication systems having at least one satellite in a non-geosynchronous orbit and/or geosynchronous orbit around earth. There can be a single satellite or many satellites in a constellation of satellites orbiting the earth. The present invention is also applicable to satellite communication systems having satellites which orbit the earth at any angle of inclination including polar, equatorial, inclined or other orbital patterns. The present invention is applicable to systems where full coverage of the earth is not achieved and to systems where multiple coverage of portions of the earth occurs.

Figure 1:
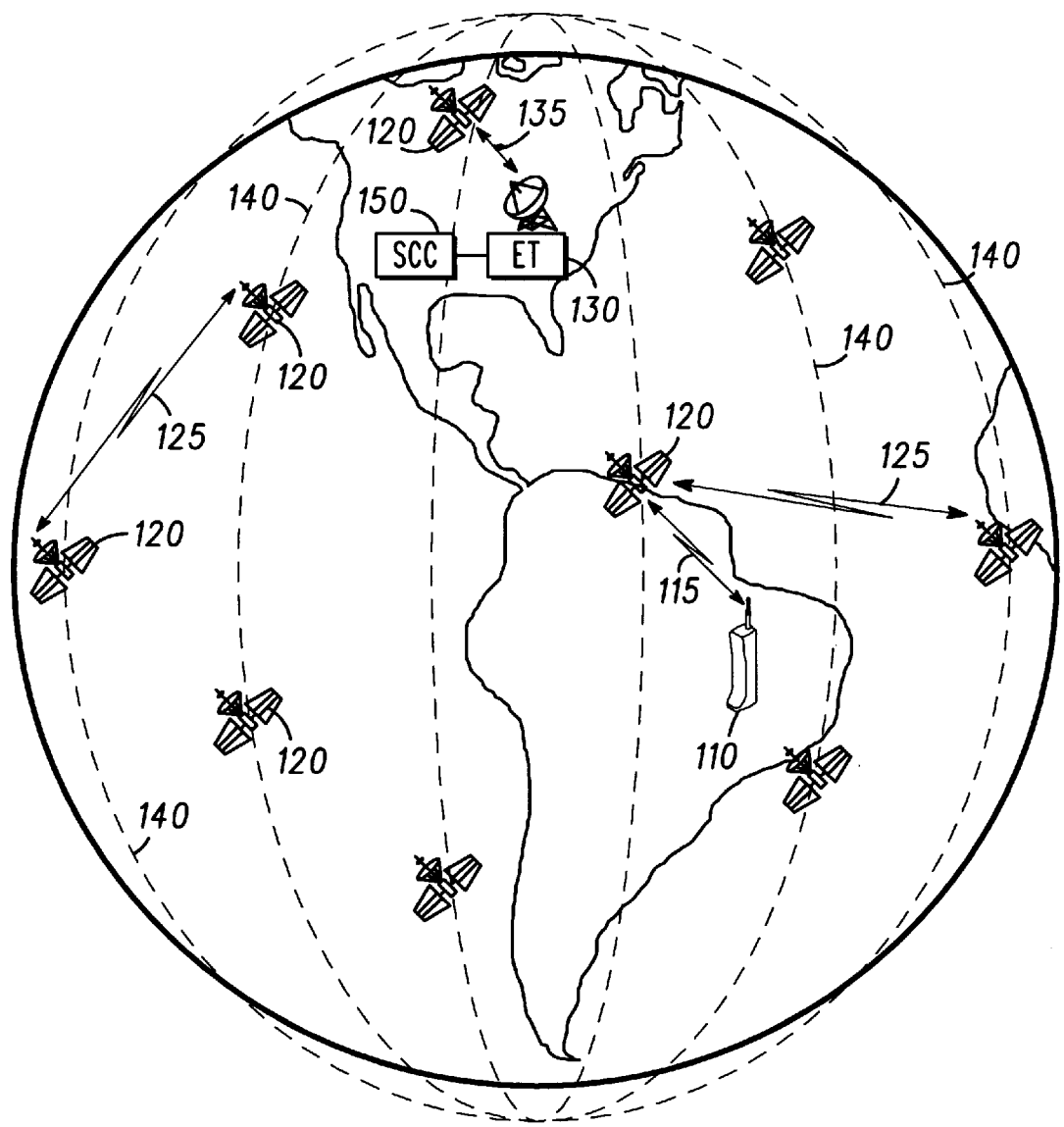
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 100 uses six polar orbits 140, with each orbit 140 holding eleven satellites 120 for a total of sixty-six satellites 120. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 120.

For example, each orbit 140 encircles earth at an altitude of around 780 km, although higher or lower orbital altitudes may be usefully employed. Due to the relatively low orbits of satellites 120, substantially line-of-sight electromagnetic (e.g., radio, light, etc.) transmission from any one satellite or reception of signals by any one satellite involves or covers a relatively small area of earth at any instant.

Satellites 120 communicate with subscriber units (SUs) 110 and earth terminals (ETs) 130 connected to system control center (SCC) 150. ETs 130 may also be connected to gateways (not shown), which provide access to the public switched telephone network (PSTN) or other communications facilities. Only one each of SCC 150 and SUs 110 are shown in FIG. 1 for clarity and ease of understanding. ETs 130 may be co-located with or separate from SCC 150. ETs 130 associated with SCCs 150 receive and transmit data between system control center 150 and SUs 110.

SUs 110 can be located anywhere on the surface of the earth or in the atmosphere above the earth. SUs 110 are preferably communications devices that transmit data to and/or receive data from satellites 120. By way of example, SUs 110 may be hand-held, portable cellular telephones adapted to communicate with satellites 120. In a preferred embodiment, SUs 110 have been adapted to use cell maps.

System 100 may accommodate a large number of SUs 110. In the preferred embodiments of the present invention, SUs 110 communicate with nearby satellites 120 through subscriber links 115. Links 115 encompass a limited portion of the electromagnetic spectrum that is divided into numerous channels. Links 115 are preferably combinations of L-Band frequency channels and may encompass Frequency Division Multiple Access (FDMA) and/or Time Division Multiple Access (TDMA) communications or combination thereof. Links 115 may also include combinations of L-Band channels that encompass Code Division Multiple Access (CDMA) communications. Preferably, each satellite 120 supports many traffic channels, and therefore, each satellite 120 can simultaneously service many independent calls.

Satellites 120 communicate with other nearby satellites 120 through cross links 125. Thus, a communication from SU 110 located at any point on or near the surface of the earth may be routed through the constellation of satellites 120 to within range of substantially any other point on the surface of the earth. A communication may be routed down to SU 110 on or near the surface of the earth from satellite 120 using subscriber link 115. Alternatively, a communication may be routed down to or up from any of many ETs 130, of which FIG. 1 shows only one, through earth link 135.

SCC 150 monitors the status of SUs 110 and desirably manages operations of communication system 100. One or more ETs 130 provide the primary communications interface between SCC 150 and satellites 120. ETs 130 include antennas and RF transceivers and preferably perform telemetry, tracking and control functions for the constellation of satellites 120.

Figure 2:
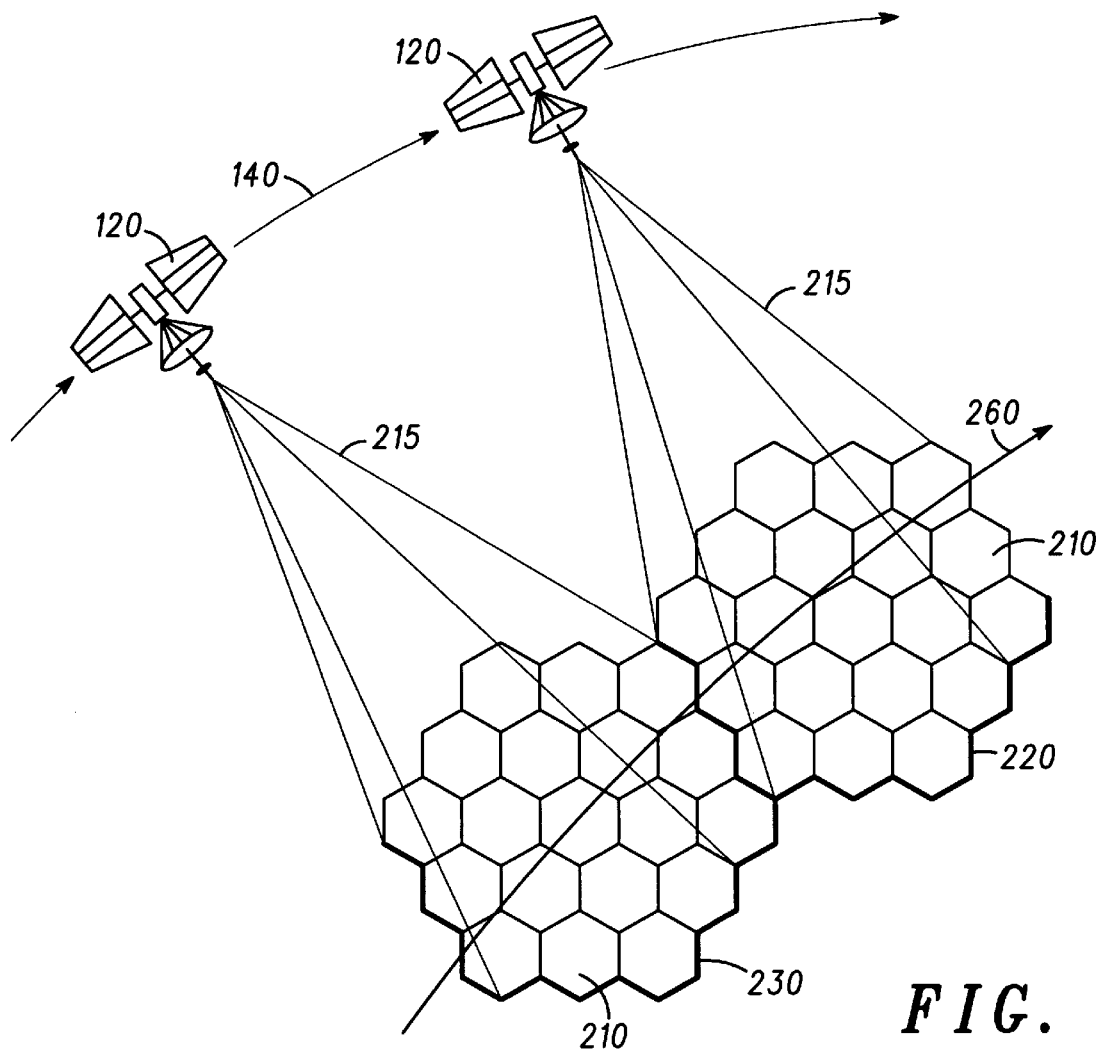
FIG. 2 illustrates a simplified diagram of a portion of a cellular pattern formed on the surface of the earth in accordance with a preferred embodiment of the present invention.

FIG. 2 illustrates a simplified diagram of a portion of a cellular pattern formed on the surface of the earth in accordance with a preferred embodiment of the present invention. Cellular pattern is formed by satellites 120 for communication system 100 of FIG. 1.

In a preferred embodiment, each satellite 120 includes an array antenna which provides numerous discrete antenna beams 215. These beams are projected at numerous diverse angles away from satellite 120. The array projects a predictable pattern on the earth's surface. An example pattern of cells 210 that satellites 120 form on the surface of the earth is shown in FIG. 2. Footprint region 220 results from the antenna beams 215 produced by an antenna array of satellite 120. Cells which reside in second footprint 230 are produced by antenna arrays from second satellite 120.

In a preferred embodiment, footprints 220, 230 are predictable; meaning that, footprints 220, 230 move across the surface of the earth in relation to the movement of satellites 120. In an alternate embodiment, satellites 120 could have footprints 220, 230 which are "earth-fixed". This means that the centers of footprints 220, 230 do not substantially move with respect to the surface of the earth, although the shape of footprints 220, 230 could change as satellites 120 move in their orbits.

In a preferred embodiment, both footprints and cells are predictable. Their size and location are known by SCC 150. SCC 150 calculates and stores cell information relative to size and shape, among other characteristics, with respect to time. The satellites' orbits 140 (FIG. 1) are known and can be used to determine ground tracks 260 for satellites 120. Ground track 260 maps the satellite's orbital position onto the earth's surface as a function of time.

On each satellite 120, there are a number of beams pointing to earth. In a preferred embodiment, each beam establishes a cell. The number of beams (cells) is unimportant to the present invention and could be a small amount or a large number of beams. At each point of the satellite's orbit about earth, the location of each of the beams (cells) is predictable (pre-planned and known). The location and size of the beam do not change for that particular point of the satellite in its orbit. The location of each beam (and thus the center of each cell) is determinable and known by the system control center. In addition, the size of each beam (and thus the size of each cell) is also determinable and known by the system control center. This cell information (size and location) is used to create cell maps.

Relative movement between subscriber units and cells causes the subscriber units and their associated communication links to move between cells. In order to permit continuous communications in an ongoing call, the system must "hand-off" an in-process call when the subscriber unit crosses a cell boundary. If a call is not handed-off to a new cell upon leaving an old cell, the call would eventually be lost because the strength of signals over which communications take place would diminish to a point where the satellite cannot receive the subscriber unit's transmissions, or vice versa.

Hand-off cell determination is performed before a subscriber unit transitions to a new cell so that it is able to receive or initiate communications. In the hand-off cell determination process, a subscriber unit and communication system work together. The hand-off process requires an SU to be capable of sustaining two simultaneous channels.

Subscriber links 115 (FIG. 1) may include one or more broadcast channels. SUs can synchronize to at least one broadcast channel and monitor the broadcast channel to monitor signal levels and obtain data messages which are addressed to them. SUs can transmit messages to communication satellites over one or more acquisition channels. Broadcast channels and acquisition channels are not dedicated to any one user but are shared by all users currently within view of satellite 120.

Conventional cellular communications systems address the hand-off problem by monitoring and comparing signal strengths for at least two channels in adjacent cells. A currently used channel associated with one cell may be monitored and compared by a subscriber unit to a candidate channel in another cell. Communications can be handed-off to the cell with the stronger channel.

In a preferred embodiment, monitoring and signal strength comparing is not performed until a hand-off timer within the subscriber unit has expired. The subscriber unit self-determines when to start the hand-off process using one or more cell maps stored within the subscriber unit. This decreases the processing load which the subscriber unit must perform for hand-offs and allows more user data to be processed.

Figure 3:
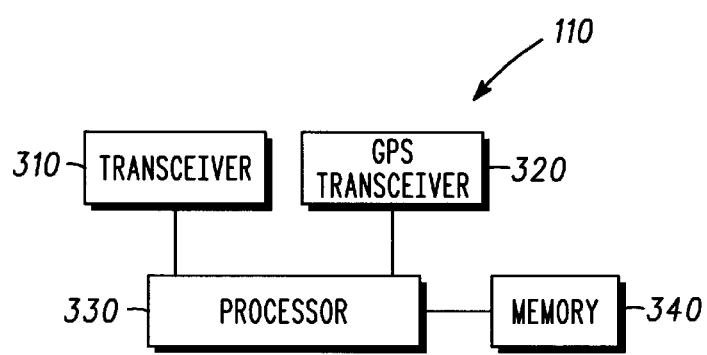
FIG. 3 illustrates a simplified block diagram of a subscriber unit for use in a preferred embodiment of the present invention.

FIG. 3 illustrates a simplified block diagram of a subscriber unit for use in a preferred embodiment of the present invention. SU 110 comprises RF transceiver 310, Global Positioning System (GPS) receiver 320, processor 330, and memory 340. RF transceiver 310 is used to transmit RF signals to and receive RF signals from a satellite. Transceiver 310 is coupled to processor 330 and to at least one antenna (not shown).

When a signal is received from a satellite by RF transceiver 310, RF transceiver 310 and processor 330 can measure the signal level for hand-off purposes. When the hand-off timer expires, processor 330 commands RF transceiver 310 to start hand-off initiation procedures.

GPS receiver 320 is coupled to processor 330 and to at least one antenna (not shown). In a preferred embodiment, GPS receiver 320 is used to geo-locate SU 110. GPS receiver provides location information, among other things, to processor 330.

Processor 330 reads and processes cell maps stored in memory 340. Processor 330 uses location information to determine which cell map to use. Processor 330 includes a hand-off timer which it controls and monitors.

The method and apparatus of the present invention allow processor 330 to perform additional user functions because it is not required to continuously monitor signal levels. Signal level monitoring is not performed until the hand-off timer expires.

Processor 330 desirably carries out procedures exemplified below and described in the associated text. For example, in addition to performing other tasks as appropriate, processor 330 desirably stores results from such procedures in memory 340.

Processor 330 generally controls and manages user interfaces, message reception and transmission, channel set-up, radio tuning, frequency and time slot assignment, and other subscriber unit communication and control functions.

Memory 340 stores data that serve as instructions to processor 330 and that, when executed by processor 330, cause SU 110 to carry out procedures which are discussed below. In addition, memory 340 includes cell maps, variables, tables, and databases that are manipulated during the operation of SU 110.

Figure 4:
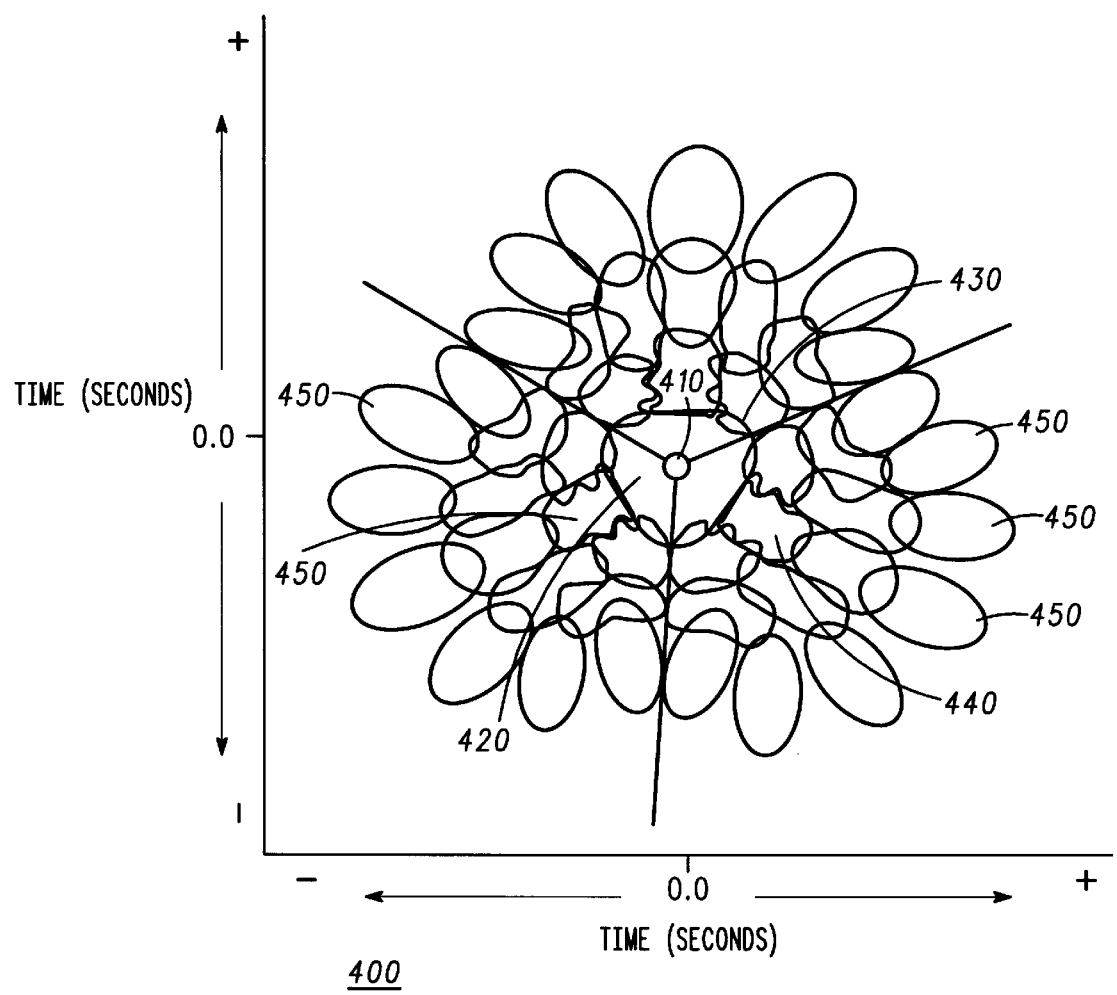
FIG. 4 illustrates a simplified view of a cell map stored in a subscriber unit in accordance with a preferred embodiment of the present invention.

FIG. 4 illustrates a simplified view of a cell map stored in a subscriber unit in accordance with a preferred embodiment of the present invention. Cell map 400, as illustrated, includes origin 410, central cell 420, central cell boundary 430, subscriber unit's current position 440 (within a cell), and a plurality of cells 450 positioned about central cell 420. The cell pattern shown in FIG. 4 is an exemplary pattern which includes multiple cells. Cell sizes and shapes can vary. Cell pattern can also vary, and the pattern shown in FIG. 4 is not necessary for the present invention.

Origin 410 is used to identify a cell map. Origin 410 is also used to position a cell map within a coordinate system. In a preferred embodiment, the coordinate system is time-based in both directions. Cell velocity has been used to normalize the distances into time-based units. Cell velocity is an indication of a cell's speed and direction relative to a point on the surface of the earth.

Central cell 420 is generally a cell with a well-defined cell boundary 430. Cell boundary 430 identifies the set of points where the hand-off initiation procedure should be started. These boundaries are calculated by a system control center based on some of the system's operational parameters, such as satellite position, transmitting power, and antenna pointing directions.

Origin 410 is also used to select a cell map to use. In a preferred embodiment, the subscriber unit's current position 440 is compared with each cell map's origin 410. The cell map with the closest origin is selected. A subscriber unit uses geo-location procedures to determine its current position.

Cell sizes can change based on decisions made by the system. For example, transmit power can be changed, and this can alter the size and shape of one or more cells. Beams can be made narrower or wider, and this causes changes in the associated cells. For example, beam width can be dependent on the time of day.

Cell maps can be satellite dependent. For example, some satellites can have transmitter and antenna characteristics which have changed due to time. In addition, cell maps can be dependent on the orbit for the satellites. Satellites in different orbits have different ground tracks. This means that cell origin 410 of cell map 400 does not have to align with current position 440 of subscriber unit. The subscriber unit has to locate itself within one of the cells in the cell map. Also, cell maps can vary based on the satellite's position within the orbit.

In a preferred embodiment, the coordinate system for cell map 400 is time-based in both the X and Y axes. This means that the distance to a cell boundary is calculated in seconds or some other time unit. All the distances have been normalized by the cell velocity to establish a completely time-based cell map.

In an alternate embodiment, cell map 400 is based on a distance-based coordinate system. For example, the units for the X and Y axes are kilometers. In this case, the subscriber unit calculates the value for the hand-off timer using the distance to a cell boundary and a relative velocity. The relative velocity being established with respect to the SU's current position and a cell boundary.

Figure 5:
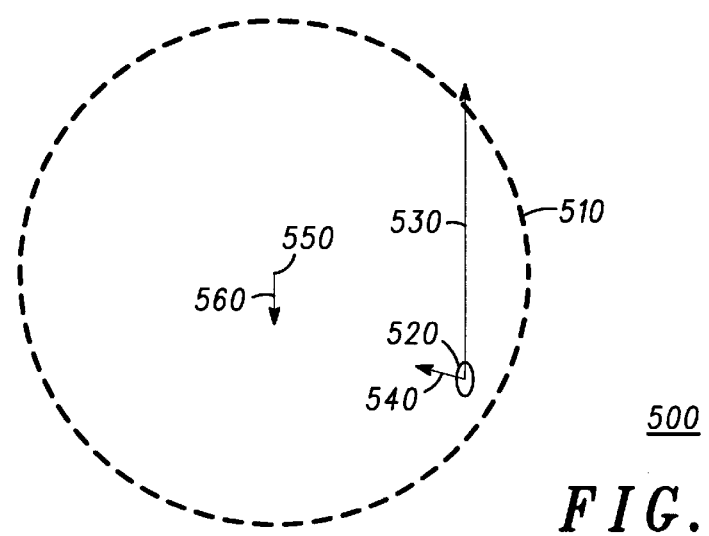
FIG. 5 illustrates a simplified view of a subscriber unit within a particular cell on a cell map in accordance with a preferred embodiment of the present invention.

FIG. 5 illustrates a simplified view of a subscriber unit within a particular cell on a cell map in accordance with a preferred embodiment of the present invention. FIG. 5 shows example cell 500 and example cell boundary 510. Cell boundary 510 is not the actual cell boundary. Cell boundary 510 determines the best point to begin the hand-off initiation process. In a preferred embodiment, cell boundary 510 is determined using cell overlap regions. Cell overlap regions occur where two or more beams are providing broadcast channels.

Example cell 500 is shown as a circle for ease of understanding and is not intended to be limiting. Example cell 500 has an origin 550 and a velocity vector 560 which indicates a direction of movement of cell 500 relative to an SU located at current position 520 within example cell 500. A difference vector 530 is also illustrated. Difference vector 530 represents the difference between the subscriber unit's current position 520 and cell boundary 510.

In a preferred embodiment, difference vector 530 is parallel to velocity vector 560. In this case, velocity vector 540 associated with the subscriber unit is assumed to be negligible. In an alternate embodiment, velocity vector 540 is not assumed to be negligible, and it is also used to determine the direction for difference vector 530. Difference vector 530 is time-based because distances within the cell map have been normalized by a cell velocity.

As cell 500 continues to move relative to SU's current position 520, SU's position eventually coincides with cell boundary 510. Subscriber unit determines this time by calculating difference vector 530. Difference vector 530 is used to establish a hand-off timer value. SU 110 knows that the best time to begin the hand-off initiation process does not occur until it reaches cell boundary 510. In this case, the subscriber unit establishes the timer and waits for it to expire before starting the hand-off initiation process.

Figure 6:
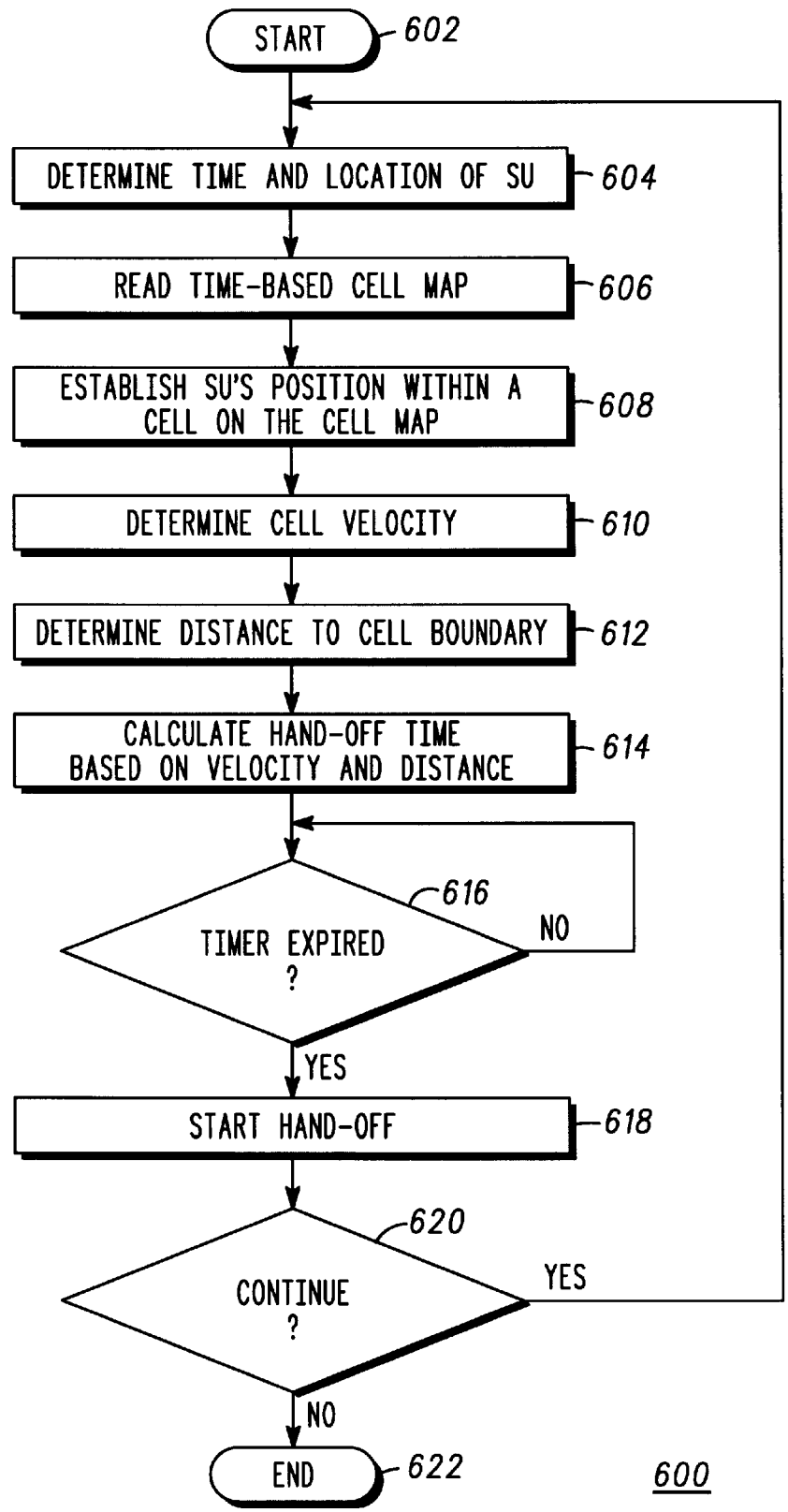
FIG. 6 illustrates a flowchart of a method for operating a subscriber unit in accordance with a preferred embodiment of the present invention.

FIG. 6 illustrates a flowchart of a method for operating a subscriber unit in accordance with a preferred embodiment of the present invention. Procedure 600 can be initiated upon power up of the subscriber unit, and it is performed at periodic intervals. Step 602 can be the result of a communication system request. During this step, the subscriber unit begins monitoring system time if it has not done so already.

In step 604, the subscriber unit's processor determines the time and location for the SU. Time is measured with respect to system time. In a preferred embodiment, system 100 (FIG. 1) is synchronized in time. The system clock settings for satellites 120 and SCC 150 are substantially the same, except for clock errors which might result from drift or hardware inaccuracies and malfunctions. The time to which system 100 is synchronized is referred to herein as the "system time". Although only one system time is used herein for exemplary purposes, multiple synchronized system times may be employed by a communication system.

Location can be determined by a number of methods. In a preferred embodiment, the SU's location is determined by the SU independent of the communication system. For example, the SU determines its location using a satellite positioning system such as the Global Positioning System (GPS). In an alternate embodiment, the SU can be dependent on the communication system for determining its location.

In step 606, the subscriber unit's processor reads a "time-based" cell map. The subscriber unit stores a number of cell maps and selects one based on the SU's present location and present time. In a preferred embodiment, the cell maps are predictions of the expected cellular pattern at particular points in time.

In the cases in which the cellular pattern does not change rapidly with time, the number of stored cell maps that are required is small. When cellular pattern changes rapidly, then the SUs store more cell maps.

In step 608, the subscriber unit's processor establishes the SU's position with a particular cell on the cell map which has been selected. In an alternate embodiment, the subscriber unit also stores maps containing finer resolution. In this case, the processor could use a finer resolution map.

In step 610, the subscriber unit's processor determines the cell velocity. In a preferred embodiment, this information is stored with the cell map information. In an alternate embodiment, the system provides cell velocity information. Cell velocity information describes both the rate of movement and the direction of movement of the cell.

In step 612, the subscriber unit's processor determines the distance to the cell boundary. In an alternate embodiment, the processor also identifies an expected hand-off cell. This information is also obtained from the current cell map.

In step 614, the subscriber unit's processor determines when a hand-off initiation procedure should start based on the subscriber unit's current position within a cell and the distance to the cell's boundary. In a time-based coordinate system, the distance is represented in units of time. The processor sets a hand-off timer based on this calculation. This is the amount of time which the SU waits before attempting to start a hand-off procedure. In an alternate embodiment, the processor also determines a confidence level for the hand-off time. When the confidence level is high, then the processor does not make another calculation. When the confidence level is low, the processor can perform another calculation at a future time. In this case, the future time is a time before the hand-off timer's scheduled expiration time.

In step 616, the subscriber unit monitors the hand-off timer to determine when the hand-off timer has expired. When the hand-off timer expires, then procedure 600 branches to step 618.

In step 618, the subscriber unit starts the hand-off process. The SU determines if another cell map is required. In an alternate embodiment, the SU can overlay two or more cell maps to optimize the hand-off process.

In step 620, the subscriber unit's processor determines if any errors occurred during the hand-off timer calculation process or the hand-off process. When an error occurs, procedure 600 branches to step 622 and ends. When an error has not occurred, then procedure 600 branches to step 604 and iterates as shown in FIG. 6.

In a preferred embodiment, the subscriber units in the communication system report their status to a system control center. Subscriber units can receive updated cell maps at various times from a system control center. A system control center can calculate new cell maps based on system level decisions. In an alternate embodiment, satellites can store cell maps and updated versions of cell maps to send to the subscriber units when these satellites establish links with the subscriber units.

In alternate embodiments, cell maps can be used to enhance the acquisition process. For example, when a subscriber unit is turned-on the cell map information could be used to determine which frequencies to use to access the system.

By reducing or eliminating the amount of signal level monitoring performed by the subscriber units, the method and apparatus of the present invention allow more time for transmission and reception of user data. This can lead to an increase in system capacity.

In summary, the method and apparatus of the present invention enable subscriber units to more efficiently determine hand-off initiation times within a cellular communication system. Cell maps allow subscriber units to accurately predict when a hand-off is going to be required, and subscriber units can then wait until then to start a hand-off process. While the principles of the invention have been described above in connection with specific apparatus, it is to be clearly understood that this description is made only by way of example and not as a limitation on the scope of the invention.

For example, although the description describes a system using LEO satellites, MEO satellites or satellites in other orbits could also or alternatively be used. Any combination of satellites in different orbits could be used for the cellular system. These and other changes and modifications which are obvious to those skilled in the art are intended to be included within the scope of the present invention.

What is claimed is:

1. A method for determining a hand-off initiation time, said method comprising the steps of:

storing at least one cell map in a subscriber unit, said at least one cell map including origin, size, and location information for a plurality of cells;

determining, by said subscriber unit, a location for said subscriber unit, said location being determined using a Global Positioning System;

calculating, by said subscriber unit, said hand-off initiation time, said hand-off initiation time being determined using said location and a cell boundary;

setting, by said subscriber unit, a hand-off initiation timer using said hand-off initiation time; and initiating, by said subscriber unit, hand-off procedures when said hand-off initiation timer expires.

2. The method as claimed in claim 1, wherein said determining step further comprises the step of:

selecting, by said subscriber unit, a cell map, said cell map being determined from said at least one cell map using said location.

3. The method as claimed in claim 2, wherein said determining step further comprises the step of:

establishing said location within a cell on said cell map.

4. The method as claimed in claim 3, wherein said determining step further comprises the step of:

determining said location in a time-based coordinate system, wherein distance has been normalized using a cell velocity.

5. The method as claimed in claim 3, wherein said determining step further comprises the step of:

determining said location in a distance-based coordinate system; and determining a distance to a cell boundary in said distance-based coordinate system.

6. The method as claimed in claim 5, wherein said calculating step further comprises the steps of:

determining a velocity vector for said cell; and calculating said hand-off initiation time using said velocity vector and said distance.

7. The method as claimed in claim 6, wherein said determining step further comprises the steps of:

determining a velocity vector for said subscriber unit; and calculating said hand-off initiation time using said velocity vector for said cell, said velocity vector for said subscriber unit, and said distance.

8. The method as claimed in claim 1, wherein said determining step further comprises the step of:

determining said location using location information from a communication system.

9. The method as claimed in claim 1, wherein said method further comprises the steps of:

obtaining new cell maps from a system control center; and storing said new cell maps.

10. A subscriber unit for self-determining a hand-off initiation time, said subscriber unit comprising:

an RIF transceiver for transmitting radio frequency (RF) signals to and receiving RF signals from a satellite;

a Global Positioning System (GPS) receiver for establishing a location for said subscriber unit;

a processor coupled to said RF transceiver, and to said GPS receiver, said processor further comprising a hand-off initiation timer, said processor determining a time for said hand-off initiation timer using cell maps and said location, said processor commanding said RF transceiver to initiate hand-off procedures when said hand-off initiation timer expires; and a memory for storing data that serve as instructions and includes said cell maps, variables, tables, and databases that are manipulated during operation of said subscriber unit, wherein said processor reads and processes said cell maps stored in said memory and uses said location to determine which of said cell maps to use.

* * * * *